(12) United States Patent
Ghosh (10) Patent No.: US 12,515,061 B2
(45) Date of Patent: Jan. 6, 2026

(54) CARDIAC RESYNCHRONIZATION THERAPY MODE SWITCHING USING MECHANICAL ACTIVITY

(71) Applicant: Medtronic, Inc., Minneapolis, MN (US)

(72) Inventor: Subham Ghosh, Blaine, MN (US)

(73) Assignee: Medtronic, Inc., Minneapolis, MN (US)

( * ) Notice: Subject to any disclaimer, the term of this patent is extended or adjusted under 35 U.S.C. 154(b) by 1080 days.

(21) Appl. No.: 17/001,627

(22) Filed: Aug. 24, 2020

(65) Prior Publication Data

US 2021/0060348 A1 Mar. 4, 2021

Related U.S. Application Data

(60) Provisional application No. 62/892,757, filed on Aug. 28, 2019.

(51) Int. Cl.
| | | |
|---|---|---|
| *A61N 1/39* | (2006.01) | |
| *A61N 1/365* | (2006.01) | |
| *A61N 1/368* | (2006.01) | |
| *A61N 1/375* | (2006.01) | |

(52) U.S. Cl.
CPC ......... *A61N 1/395* (2013.01); *A61N 1/36542* (2013.01); *A61N 1/36578* (2013.01); *A61N 1/36842* (2017.08); *A61N 1/36843* (2017.08); *A61N 1/3688* (2013.01); *A61N 1/3756* (2013.01); *A61N 1/39622* (2017.08)

(58) Field of Classification Search
CPC .. A61N 1/368; A61N 1/3684; A61N 1/36842; A61N 1/36843; A61N 1/3688
See application file for complete search history.

(56) References Cited

U.S. PATENT DOCUMENTS

| | | | |
|---|---|---|---|
| 10,342,981 B2 | 7/2019 | Ghosh et al. | |
| 2011/0319951 A1 | 12/2011 | More et al. | |
| 2013/0066222 A1* | 3/2013 | Rosenberg | A61B 5/363 |
| | | | 600/509 |
| 2016/0015984 A1 | 1/2016 | Demmer et al. | |
| 2018/0028814 A1 | 2/2018 | Ghosh | |
| 2018/0078773 A1* | 3/2018 | Thakur | A61N 1/39622 |
| 2018/0154154 A1* | 6/2018 | Sheldon | A61N 1/37205 |
| 2018/0212451 A1 | 7/2018 | Schmidt et al. | |
| 2019/0209845 A1 | 7/2019 | Stadler et al. | |
| 2020/0261725 A1 | 8/2020 | Yang et al. | |
| 2020/0261734 A1 | 8/2020 | Yang et al. | |

OTHER PUBLICATIONS

International Search Report and Written Opinion from PCT Application No. PCT/US2020/047805 dated Nov. 6, 2020, 13 pages.

* cited by examiner

*Primary Examiner* — Allen Porter
(74) *Attorney, Agent, or Firm* — Mueting Raasch Group (57) ABSTRACT

A method includes determining whether electrical activity is indicative of atrial fibrillation, determining whether mechanical activity is indicative of atrial fibrillation, and adjusting a pacing parameter or mode based on whether the electrical activity and the mechanical activity are indicative of atrial fibrillation. The electrical activity may be detected based on a far-field measurement. The method may be performed using a leadless implantable medical device.

22 Claims, 7 Drawing Sheets

CARDIAC RESYNCHRONIZATION THERAPY MODE SWITCHING USING MECHANICAL ACTIVITY

The present application claims the benefit of U.S. Provisional Application No. 62/892,757, filed Aug. 28, 2019, which is incorporated herein by reference in its entirety.

The present technology generally relates to cardiac therapy and particularly relates to cardiac resynchronization therapy.

Cardiac therapy can be provided by some implantable medical devices, such as cardiac pacemakers or implantable cardioverter defibrillators, which may deliver therapeutic electrical stimulation to a heart of a patient via electrodes of one or more implantable leads. Therapeutic electrical stimulation may be delivered to the heart in the form of pulses or shocks for pacing, cardioversion, or defibrillation. In some cases, implantable medical devices may sense intrinsic depolarizations, or intrinsic activations, of the heart and control the delivery of therapeutic stimulation to the heart based on the sensed intrinsic activations.

Cardiac resynchronization therapy (CRT) is one type of therapy that is delivered by some implantable medical devices. CRT may help enhance cardiac output by resynchronizing the electromechanical activity of the ventricles of the heart. Ventricular desynchrony may occur, for example, in patients that suffer from congestive heart failure. CRT may change depending on various parameters, such as the presence of atrial fibrillation (AF).

SUMMARY

The techniques of this disclosure generally relate to cardiac therapy systems and methods that utilize mode switching to administer different sensing and pacing modes, for example, during CRT based on the presence of AF. In particular, mechanical activity may be used to confirm electrical activity that indicates the presence of AF. In some embodiments, the signal from a motion sensor may be used to confirm whether one or both atria are in AF or whether P-wave detection parameters should be adjusted, such as detection sensitivity parameters or P-wave blanking periods.

In one aspect, the present disclosure provides an implantable medical system including: a first electrode to sense electrical activity of one or both ventricles of a patient's heart or to deliver cardiac therapy to one or both ventricles of the patient's heart; a second electrode to sense electrical activity of one or both atria of the patient's heart; a motion sensor to sense mechanical activity of the patient's heart; and a controller operably coupled to the first electrode, second electrode, and the motion sensor. The controller is configured to: switch between a dual-chamber sensing mode to deliver pacing based on sensing electrical activity of at least one atrium and at least one ventricle of the patient's heart and a single-chamber sensing mode to deliver pacing based on sensing electrical activity of only one or both ventricles of the patient's heart; deliver pacing to at least one of the ventricles of the patient's heart using the first electrode in the dual-chamber sensing mode; determine whether the electrical activity of one or both atria sensed by the second electrode is indicative of atrial fibrillation; in response to determining that the electrical activity of one or both atria is indicative of atrial fibrillation, determine whether mechanical activity of the patient's heart sensed by the motion sensor represents atrial contraction; and in response to determining that the mechanical activity of the patient's heart does not represent the atrial contraction, deliver inhibited pacing using the first electrode in the single-chamber sensing mode.

In another aspect, the present disclosure provides a method including: delivering pacing to at least one of the ventricles of a patient's heart in a dual-chamber sensing mode to deliver pacing based on sensing electrical activity of at least one atrium and at least one ventricle of the patient's heart; determining whether electrical activity of one or both atria of the patient's heart is indicative of atrial fibrillation; in response to determining that the electrical activity of one or both atria is indicative of atrial fibrillation, determining whether mechanical activity of the patient's heart represents an atrial contraction; and in response to determining that the mechanical activity of the patient's heart does not represent the atrial contraction, delivering inhibited pacing to at least one of the ventricles of the patient's heart in a single-chamber sensing mode to deliver pacing based on sensing electrical activity of only one or both ventricles of the patient's heart.

In yet another aspect, the present disclosure provides an implantable medical system including: a first medical device having a housing implantable in at least one of the ventricles of a patient's heart. The first medical device includes at least one electrode to sense electrical activity of at least one of the ventricles or to deliver cardiac therapy to at least one of the ventricles of the patient's heart, and at least one motion sensor to sense mechanical activity of the patient's heart. The system further includes a second medical device in operative communication with the first medical device having at least one electrode to sense electrical activity of one or both atria of the patient's heart and a controller. The controller is configured to: switch between a dual-chamber sensing mode to deliver pacing based on sensing electrical activity of at least one atrium and at least one ventricle of the patient's heart and a single-chamber sensing mode to deliver pacing based on sensing electrical activity of only one or both ventricles of the patient's heart; deliver pacing to at least one of the ventricles of the patient's heart in the dual-chamber sensing mode; determine whether the electrical activity of one or both atria sensed by the second medical device is indicative of atrial fibrillation; in response to determining that the electrical activity of one or both atria is indicative of atrial fibrillation, determine whether mechanical activity of the patient's heart sensed by the first medical device represents the atrial contraction; and in response to determining that the mechanical activity of the patient's heart does not represent the atrial contraction, deliver inhibited pacing to at least one of the ventricles of the patient's heart in the single-chamber sensing mode.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to cardiac therapy and particularly relates to CRT. Some types of CRT may utilize mode switching, such as switching between different types of sensing and pacing modes, in response to a particular condition of the patient's heart. For example, some cardiac therapy systems may be configured to switch from a VDD/DDD mode to a VVI mode upon detecting AF.

Some cardiac therapy systems are implanted in only some regions, or chambers, of the heart. Such cardiac therapy systems may utilize far-field sensing techniques to detect activity in other regions of the heart. During CRT of a patient's heart, P-waves (which may also be referred to as atrial P-waves) may be sensed by a cardiac therapy system and used to trigger pacing after a predetermined atrioventricular (AV) delay, for example, in VDD/DDD sensing and pacing modes.

Using far-field sensing techniques to accurately sense P-waves may be more challenging than using near-field sensing techniques due to the relatively smaller size, such as magnitude or amplitude, of far-field P-waves compared to near-field P-waves and possible sources of noise. Atrial fibrillation may even further reduce the size of the far-field P-wave, which may compound the challenge of using far-field sensing techniques to detect P-waves.

The present disclosure provides cardiac therapy systems and methods that utilize mode switching to administer different sensing and pacing modes during CRT based on the presence of AF. In particular, mechanical activity may be used to confirm electrical activity that indicates the presence of AF. In some embodiments, the signal from a motion sensor may be used to confirm whether one or both atria are in AF or whether P-wave detection parameters should be adjusted, such as detection sensitivity parameters or P-wave blanking periods.

For example, when far-field P-waves are not detected, mechanical activity may be used to determine whether the patient's heart is in AF based on concomitant measurements. In particular, cardiac therapy systems may measure mechanical activity using a motion sensor to facilitate the determination of whether the patient's heart is in AF. Based on the AF determination, the system may be configured to mode switch or adjust P-wave sensitivity levels to better detect far-field P-waves when the patient's heart is not in AF.

As used herein, the term "or" is generally employed in its inclusive sense, for example, to mean "and/or" unless the context clearly dictates otherwise. The term "and/or" means one or all of the elements or a combination of at least two of the elements.

The drawings of the present disclosure depict one or more aspects described in this disclosure. However, other aspects not depicted in the drawings also fall within the scope of this disclosure. Like numbers may be used in the figures to refer to like components, steps, or other elements. However, the use of a reference character to refer to an element in a given figure is not intended to limit the element in another figure labeled with the same reference character, and vice versa, the use of different reference characters to refer to elements in different figures is not intended to indicate that the differently referenced elements cannot be the same or similar.

Figure 1:
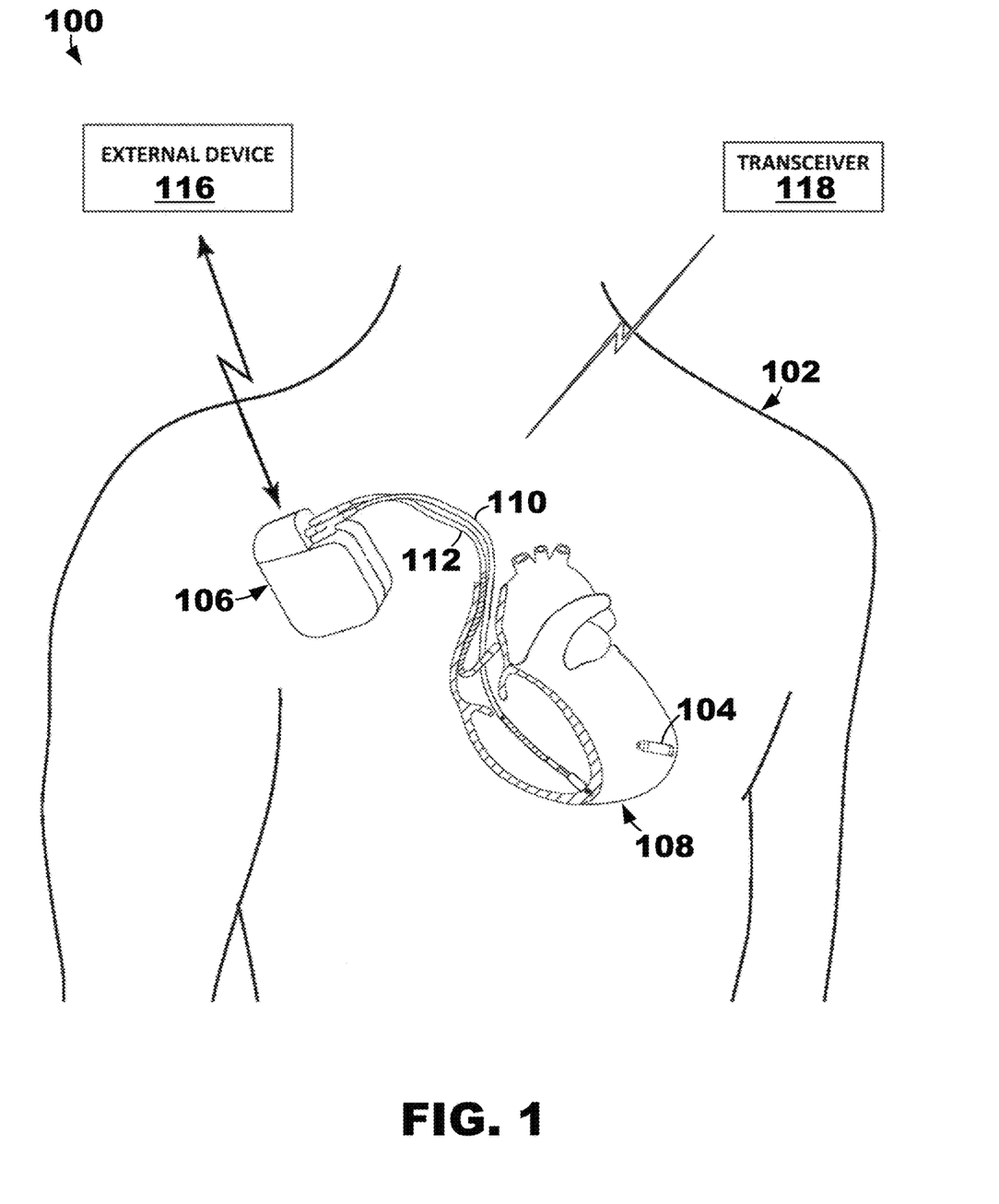
FIG. 1 is a conceptual diagram that shows one example of a cardiac therapy system according to the present disclosure including a first medical device and a second medical device.

FIG. 1 is one example of a cardiac therapy system 100 in use with a patient 102. The systems, devices, and techniques described in this disclosure provide for mode switching that may be robust enough for use with far-field sensing, for example, of atrial activation. In general, the system 100 may include one or more implantable medical devices (IMDs) to carry out cardiac therapy with mode-switching capability. Each IMD may be configured to detect electrical activity in one or more chambers of the patient's heart 108. One or more IMDs may be used to detect the ventricular electrical activity, atrial electrical activity, and mechanical activity of one or more chambers. In particular, one or more electrodes may be used to sense, or detect, electrical activity, and one or more motion sensors may be used to sense, or detect, mechanical activity.

The one or more IMD's of the system 100 may include leadless or leaded IMDs. As used herein, a "leadless" device refers to a device being free of a lead extending out of the patient's heart 108. In other words, a leadless device may have a lead that does not extend from outside of the patient's heart 108 to into the inside of the patient's heart. Some leadless devices may be introduced through a vein, but once implanted, the device is free of, or may not include, any transvenous lead and may be configured to provide cardiac therapy without using any transvenous lead. In one example, a leadless device implanted in the left ventricle (LV), in particular, does not use a lead to operably connect to an electrode in the LV when a housing of the device is positioned in the LV.

The system 100 may include one or more intracardiac IMDs. As used herein, an "intracardiac" device refers to a device configured to be implanted entirely within the heart 108. An intracardiac IMD may include a leadlet, which does not extend out of the patient's heart 108.

A first electrode of the system 100 may be configured to sense electrical activity of one or both ventricles (left, right, or both) of the patient's heart 108 or to deliver cardiac therapy to the particular ventricle of the patient's heart. A second electrode of the system 100 may be configured to sense electrical activity of an atrium of the patient's heart 108. In some cases, the second electrode may also be configured to deliver cardiac therapy to the particular atrium of the patient's heart 108.

One or more leadless electrodes may be coupled to the housing of an IMD. An IMD having only leadless electrodes may be described as a leadless IMD. As used herein, a "leadless" electrode refers to an electrode operably coupled to a device being free of a lead, or without using a lead, extending between the electrode and the housing of the device. In some embodiments, the first medical device 104 make take the form similar to a leadless MICRA™ available from Medtronic plc, of Dublin, Ireland, implanted in the LV.

A motion sensor of the system 100 may be configured to sense mechanical activity of the patient's heart 108. In some cases, the motion sensor may be configured to sense at least mechanical activity of one or both atria (left, right, or both) of the patient's heart 108. The motion sensor used may be the same as or similar to the motion sensor 11 described with respect to FIG. 2.

A controller of the system 100, which may include processing circuitry, may be operably coupled to one or more of the electrodes and to the motion sensor. The operable coupling may be made using a wired or wireless connection. Using the one or more electrodes and the motion sensor, the controller may be configured to deliver pacing to at least one of the ventricles of the patient's heart 108 using the first electrode based on dual-chamber sensing in a dual-chamber sensing mode or single-chamber sensing in a single-chamber sensing mode. The controller may also be configured to determine whether or not the electrical activity of at least one of the atria sensed by the second electrode is indicative of AF. The controller may also be configured to determine whether or not mechanical activity of the patient's heart 108 sensed by the motion sensor is indicative of AF, for example, for example, in response to determining that the electrical activity of one or both atria are indicative of AF. The mechanical activity may represent an atrial contraction. The atrial contraction of the patient may be referred to as an "atrial kick." The absence of the atrial kick may be indicative of AF. Further, the controller may be configured to deliver inhibited pacing using the first electrode based on single-chamber sensing, for example, in response to determining that the mechanical activity of the patient's heart 108 is indicative of AF (or does not represent an atrial contraction or atrial kick).

Figure 2:
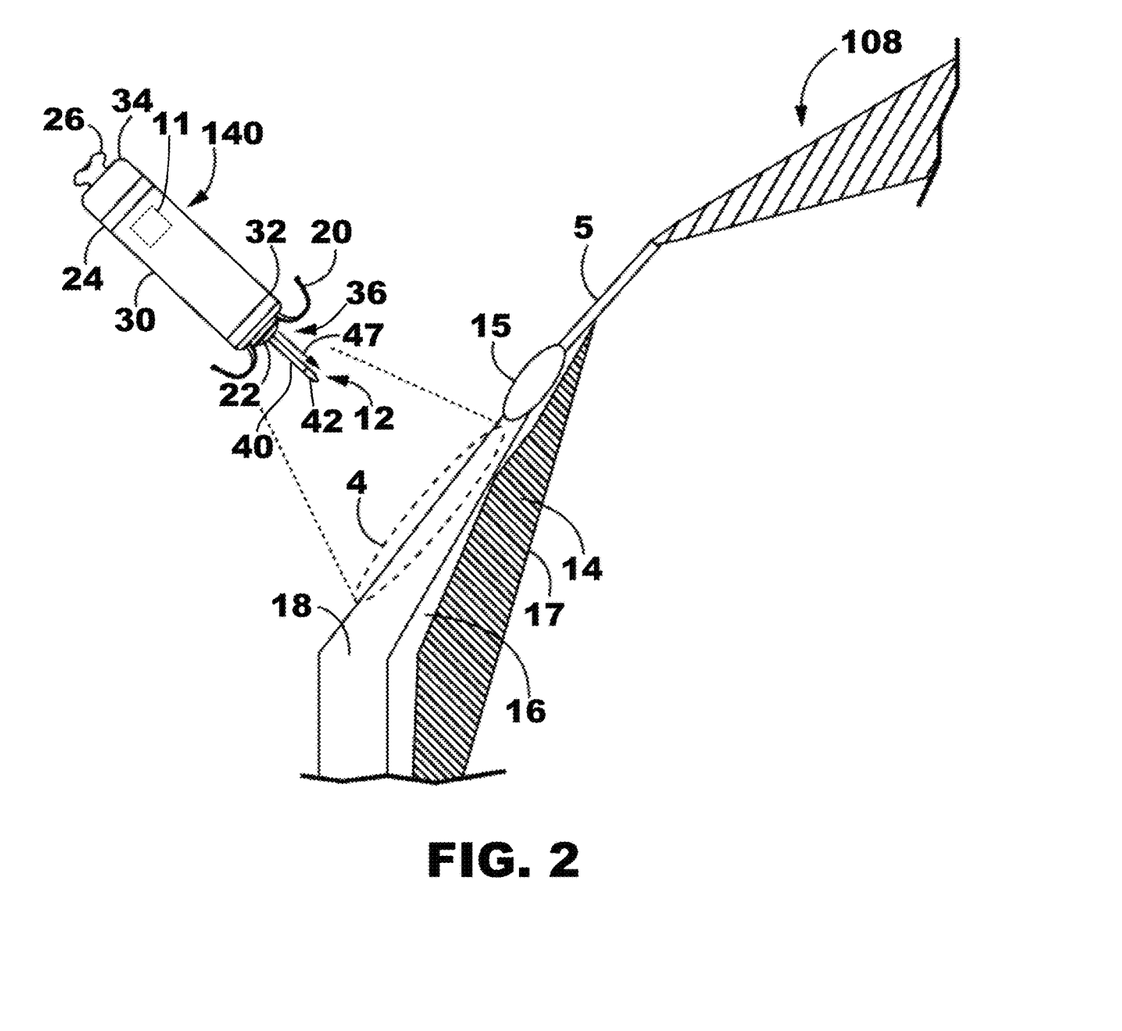
FIG. 2 is a conceptual diagram that shows one example of an implantable medical device implanted from the triangle of Koch region that may be used with, for example, the cardiac therapy system of FIG. 1.

In one embodiment, the system 100 may include only one intracardiac or leadless IMD implantable in the right atrium (RA) toward the LV (such as IMD 140 of FIG. 2). The intracardiac or leadless IMD may include a first electrode implantable to sense near-field electrical activity of the LV of the patient's heart 108 or to deliver cardiac therapy to the LV of the patient's heart. The intracardiac or leadless IMD may also include a second electrode implantable to sense near-field electrical activity of the RA of the patient's heart 108 or to deliver cardiac therapy to the RA of the patient's heart.

In another embodiment, the system 100 may include only one intracardiac or leadless IMD implanted in the LV (such as first medical device 104 of FIG. 1). The intracardiac or leadless IMD may include a first electrode implantable to sense near-field electrical activity of the LV of the patient's heart 108 or to deliver cardiac therapy the LV of the patient's heart. The intracardiac or leadless IMD may also include a second electrode implantable to sense far-field electrical activity of the RA of the patient's heart 108.

In another embodiment, the system 100 may include one intracardiac or leadless IMD and one a leaded IMD (such as first medical device 104 and second medical device 106 of FIG. 1). The intracardiac or leadless IMD may be implantable in the LV and include a first electrode to sense electrical activity of the LV of the patient's heart 108 or to deliver cardiac therapy to the LV of the patient's heart. The leaded IMD may include a second electrode to sense electrical activity of the RA of the patient's heart 108 or to deliver cardiac therapy to the RA of the patient's heart. The leaded IMD may be configured to communicate at least an atrial activation time to the intracardiac or leadless IMD.

The system 100 may include one or both of a first medical device 104 and a second medical device 106. Any suitable medical devices may be used for the first medical device 104 and the second medical device 106. For example, the first medical device 104 or the second medical device 106 may represent a defibrillator, a cardiac resynchronization pacer/defibrillator, or a pacemaker. The first medical device 104 and the second medical device 106 may be described as IMDs. In the illustrated embodiment, one or both of the first medical device 104 and the second medical device 106 may be configured to deliver pacing therapy, such as pacing therapy to the right and left ventricles of heart 108, respectively, to provide CRT pacing.

In general, when two or more medical devices are used, the devices may be implanted in different chambers of the patient's heart 108. As shown, the first medical device 104 is a leadless IMD implanted in the LV of the patient 102, and the second medical device 106 is a leaded IMD having a leaded electrode implanted in each of the RA and the right ventricle (RV) of the patient's heart.

The first medical device 104 may be a leadless IMD internal to the heart 108 of the patient. The first medical device 104 may also be described as an intracardiac IMD. The first medical device 104 may be described as a left-side IMD implanted in the left side of the patient's heart 108. In some embodiments, one or more IMDs similar to the first medical device 104 (not shown in FIG. 1) may additionally or alternatively be implanted within other chambers of heart 108 or attached to the heart epicardially.

The first medical device 104 may be configured to sense electrical activity of the heart 108 and to deliver pacing therapy, such as CRT to the heart 108. The first medical device 104 may be attached to an interior wall of the heart 108 via one or more fixation elements that penetrate the tissue. These fixation elements may secure the first medical device 104 to the cardiac tissue and retain an electrode (e.g., a cathode or an anode) on the housing of the first medical device in contact with the cardiac tissue, such as the endocardium or the myocardium. In addition to delivering pacing pulses, the first medical device 104 may be configured to sense or monitor electrical activity, in the form of one or more electrical signals, using the electrodes carried on the housing of the first medical device 104. The electrical activity may be generated by cardiac muscle and indicative of depolarizations and repolarizations of the heart 108 at various times during the cardiac cycle.

The second medical device 106 may include a housing coupled to one or both of a ventricular lead 110 and an atrial lead 112. In various embodiments, the second medical device 106 is an implantable cardioverter-defibrillator (ICD) capable of delivering pacing, cardioversion, and defibrillation therapy to the heart 108. In particular, the second medical device 106 may be an extravascular ICD (EVICD) having an extravascular housing. The ventricular lead 110 and atrial lead 112 may be operably coupled, or electrically coupled, to a housing of the second medical device 106 and extend into the patient's heart 108. The ventricular lead 110 may include electrodes (not labeled in FIG. 1) positioned on the lead in the patient's RV for sensing ventricular electrogram (EGM) signals and pacing in the RV. The atrial lead 112 includes electrodes (not labeled in FIG. 1) positioned on the lead in the patient's RA for sensing atrial EGM signals and pacing in the RA. The ventricular lead 110 or the atrial lead 112 may also include coil electrodes used to deliver cardioversion and defibrillation shocks. The second medical device 106 may also include one or more electrodes on its housing.

The first medical device 104, the second medical device 106, the ventricular lead 110, or the atrial lead 112 may be used to acquire near-field or far-field cardiac EGM signals from the patient 102 and to deliver cardiac therapy in response to the acquired data. In some embodiments, the sensed electrical activity of one of the atria may be based on one or more far-field measurements sensed by the one of the electrodes coupled to the first medical device 104, the second medical device 106, the ventricular lead 110, or the atrial lead 112. For example, a housing-based electrode coupled to the first medical device 104, a housing-based electrode coupled to the second medical device 106, or the ventricular lead 110 may be used to detect a far-field atrial signal, such as a far-field P-wave signal. In another example, a far-field intrinsic ventricular activation signal may be detected using one or more devices or leads.

The second medical device 106 is shown as being configured for a dual-chamber IMD configuration, but other examples may include one or more additional leads, such as a coronary sinus lead extending into the RA, through the coronary sinus and into a cardiac vein to position electrodes along the LV for sensing LV EGM signals and delivering pacing pulses to the LV.

In some embodiments, the second medical device 106 may be configured for a single-chamber IMD system, or otherwise not include the atrial lead 112. In such embodiments, near-field EGM signals of one or both atria may not be available to the cardiac therapy system 100. The first medical device 104 or the second medical device 106 may be used to detect a far-field EGM signal of one or both atria.

Processing circuitry, sensing circuitry, and other circuitry configured for performing the techniques described herein with respect to the first medical device 104 and the second medical device 106 may be housed within a respective sealed housing. The housing (or a portion thereof) may be conductive so as to serve as an electrode for pacing or sensing, or as an active electrode during defibrillation. As such, the housing of some IMDs may be described as including a housing electrode, or a housing-based electrode.

In some examples, the first medical device 104 and the second medical device 106 may engage in wireless communication to facilitate such coordinated activity. The communication may be one-way communication or two-way communication. In some embodiments, wireless communication may utilize a distinctive, signaling, or triggering electrical pulse provided by an electrode of the first medical device 104 that conducts through the patient's tissue and is detectable by the second medical device 106, or vice versa. Wireless communication may use a communication interface, which may include an antenna to provide electromagnetic radiation that propagates through patient's tissue and is detectable, for example, using a communication interface of the other IMD.

In various embodiments, one or both of the first medical device 104 and the second medical device 106 are configured to communicate wirelessly, or by wire, with an external device 116.

The first medical device 104 or the second medical device 106 may transmit EGM signal data, cardiac rhythm episode data, or data regarding delivery of therapy to the external device 116. In various embodiments, the external device 116 may be a computing device, e.g., used in a home, ambulatory, clinic, or hospital setting, to communicate via wireless, or wired, telemetry. The external device 116 may be coupled to a remote patient monitoring system, such as Carelink®, available from Medtronic plc, of Dublin, Ireland. The external device 116 may be, for example, a programmer, external monitor, or consumer device, such as a smart phone.

The external device 116 may be used to program commands or operating parameters into the first medical device 104 or the second medical device 106 for controlling the functioning of these devices. In general, the external device 116 may be used to interrogate these devices to retrieve data, including device operational data as well as physiological or neurological data accumulated in memory in either of these devices. The interrogation may be automatic, e.g., according to a schedule, or in response to a remote or local user command. One or more of these external devices may also be referred to as an "instrument" or as a group of instruments. The external device 116 may be included as part of a recharging system configured to recharge the battery or other power source provided within the first medical device 104 or the second medical device 106.

The cardiac therapy system 100 may also include a transceiver 118 coupled to communicate wirelessly, or by wire, with the first medical device 104 or the second medical device 106. In some embodiments, the transceiver 118 may be described as an access point that provides a communication link between the first medical device 104 and the second medical device 106, such as a network. The transceiver 118 may use similar communication techniques as the other devices and may be included as part of a recharging system.

The first medical device 104 and the second medical device 106 may be configured cooperatively to coordinate their cardiac rhythm detection and treatment activities. In some embodiments, the second medical device 106 is operably coupled to the first medical device 104 to communicate an atrial activation time to the first medical device to deliver pacing from the first medical device based on the atrial activation time.

For example, leadless resynchronization pacing devices, such as the first medical device 104 implanted in the LV, may communicate with the second medical device 106, or right-side implanted system or an extravascular system (e.g., EVICD). The second medical device 106 may be used to sense atrial electrical activity, which may be used to trigger the first medical device 104 to pace at a predetermined AV delay following an intrinsic atrial activation, or atrial sensed event (e.g., P-wave). When the second medical device 106 does not sense the atrial electrical activity directly and uses, for example, far-field P-wave sensing techniques, the P-waves may be harder to sense accurately during AF. The cardiac therapy system 100 may be configured to mode switch upon detecting AF, for example, from a VDD/DDD mode to a VVI mode. In such a case, concomitant measurements from may help confirm presence or absence of AF and accordingly help cardiac therapy system 100 to mode switch properly. In some embodiments, the first medical device 104 may include a motion sensor. Mechanical activity detected by the motion sensor may be used as a concomitant measurement to facilitate AF detection.

FIG. 2 shows one example of an intracardiac or leadless implantable medical device 140 and anatomical structures of the patient's heart 108 that may be used with cardiac therapy systems of the present disclosure. The device 140 may be the same or similar to first medical device 104 except that the medical device 140 is implanted from the triangle of Koch region in the RA into the LV instead of being implanted within the LV. One or more of the features described with respect to device 140 may also be used with the first medical device 104 or even a leaded IMD. For example, the device 140 may be used alone or in coordination with the second medical device 106 instead of, or in addition to, the first device 104.

In other embodiments (not shown), IMD 140 may be replaced with a leaded device coupled to an implantable medical lead, which may be similar to lead 110 or lead 112, and may be coupled to second IMD, such as device 106, or may be coupled to an external device, such as device 116. One example of a leaded device is described in U.S. Patent App. No. 62/805,749 (Yang et al.), filed Feb. 14, 2019, entitled "Lead-in-lead systems and methods for cardiac therapy," which is incorporated herein by reference. A motion sensor 11 may be integrated into, for example, a distal end portion or distal tip, of the lead of the leaded device to detect mechanical activity of the heart instead of extrinsic motion. In some embodiments, the distal end portion or the distal tip of the lead may have a small piezoelectric sensor in the motion sensor 11 configured to detect myocardial motion.

The intracardiac IMD 140 may include a housing 30. The housing 30 may define a hermetically sealed internal cavity in which internal components of the device 140 reside, such as a sensing circuit, therapy delivery circuit, control circuit, memory, telemetry circuit (or communication interface), other optional sensors, and a power source. The housing 30 may be at least partially formed from electrically conductive material. Additionally, or alternatively, the housing 30 may be formed at least partially from non-conductive material.

The housing 30 may be described as extending between a distal end region 32 and a proximal end region 34 in a generally cylindrical shape to facilitate delivery. The housing 30 may include a delivery tool interface member 26, e.g., at the proximal end 34, for engaging with a delivery tool during implantation of the device 140. For example, the delivery tool interface member 26 may be used while the device 140 is advanced toward a target implant region 4 using a delivery catheter.

All or a portion of the housing 30 may function as an electrode during cardiac therapy, for example, in sensing and/or pacing. In the example shown, the housing-based electrode 24 is shown to circumscribe a proximal portion of the housing 30. When the housing 30 includes (e.g., is formed from) an electrically conductive material, portions of the housing 30 may be electrically insulated by a non-conductive material, such as a coating, leaving one or more discrete areas of conductive material exposed to define the proximal housing-based electrode 24. When the housing 30 includes (e.g., is formed from) a non-conductive material, an electrically conductive coating or layer may be applied to one or more discrete areas of the housing 30 to form the proximal housing-based electrode 24. In other examples, the proximal housing-based electrode 24 may be a component, such as a ring electrode, that is mounted or assembled onto the housing 30. The proximal housing-based electrode 24 may be electrically coupled to internal circuitry of the device 140, e.g., via the electrically-conductive housing 30 or an electrical conductor when the housing 30 includes a non-conductive material.

In the example shown, the housing-based electrode 24 is located nearer to the housing proximal end region 34 than the housing distal end region 32 and may, therefore, be described as being a proximal housing-based electrode. In other examples, however, the housing-based electrode 24 may be located at other positions along the housing 30, for example, relatively more distally than the position shown.

At the distal end region 32, the device 140 may include a distal fixation and electrode assembly 36, which may include one or more fixation members 20, in addition to one or more dart electrodes 12 of equal or unequal length. The one or more dart electrodes 12 of the assembly 36 may be described as tissue-piercing electrodes. In other embodiments (not shown), the distal fixation and electrode assembly 36 may include a helical or spiral-shaped electrode. A dart electrode or a helix electrode may also be described as a tissue-piercing electrode.

The device 140 as depicted includes a single dart electrode 12 that may include a shaft 40 extending distally away from the housing distal end region 32 and may include one or more electrode elements, such as a tip electrode element 42 at or near the free, distal end region of the shaft 40. The tip electrode element 42 may have a conical or hemi-spherical distal tip with a relatively narrow tip diameter (e.g., less than about 1 millimeter (mm)) for penetrating into and through tissue layers without using a sharpened tip or needle-like tip having sharpened or beveled edges.

The shaft 40 of the dart electrode 12 may be a normally straight member and may be rigid. In other embodiments, the shaft 40 may be described as being relatively stiff but still possessing limited flexibility in lateral directions (e.g., resilient or semi-rigid). The dart electrode 12 may be configured to pierce through one or more tissue layers to position the tip electrode element 42 within a desired tissue layer, e.g., the ventricular myocardium. As such, the length or height 47 of the shaft 40 may correspond to the expected pacing site depth. If a second dart electrode 12 is employed, its length or height may be unequal to the expected pacing site depth and may be configured to act as an indifferent electrode for delivery of pacing energy to the tissue.

The one or more fixation members 20 may be described as one or more "tines" having a normally-curved position. The tines may be held in a distally extended position within a delivery tool. The distal tips of tines may penetrate the heart tissue to a limited depth before elastically curving back proximally into the normally curved position (shown) upon release from the delivery tool.

In some examples, the distal fixation and electrode assembly 36 includes a distal housing-based electrode 22. In the case of using the device 140 as a pacemaker for multiple-chamber pacing (e.g., dual- or triple-chamber pacing) and sensing, the tip electrode element 42 may be used as a cathode electrode paired with the proximal housing-based electrode 24 serving as a return anode electrode. Alternatively, the distal housing-based electrode 22 may serve as a return anode electrode paired with tip electrode element 42 for sensing ventricular signals and delivering ventricular pacing pulses. In other examples, the distal housing-based electrode 22 may be a cathode electrode for sensing atrial signals and delivering pacing pulses to the atrial myocardium in the target implant region 4. When the distal housing-based electrode 22 serves as an atrial cathode electrode, the proximal housing-based electrode 24 may serve as the return anode paired with the tip electrode element 42 for ventricular pacing and sensing and as the return anode paired with the distal housing-based electrode 22 for atrial pacing and sensing.

As shown in this illustration, the target implant region 4 in some pacing applications is along the atrial endocardium 18, generally inferior to the AV node 15 and the His bundle 5. The dart electrode 42 may define the length or height 47 of the shaft 40 for penetrating through the atrial endocardium 18 in the target implant region 4, through the central fibrous body 16, and into the ventricular myocardium 14 without perforating through the ventricular endocardial surface 17. When the length or height 47 of the dart electrode 12 is fully advanced into the target implant region 4, the tip electrode element 42 may rest, or be positioned, within the ventricular myocardium 14, and the distal housing-based electrode 22 may be positioned in intimate contact with or close proximity to the atrial endocardium 18.

The device 140 (as shown) and the devices 104, 106 may include a motion sensor 11, or motion detector, which may be contained in the housing 30. The motion sensor 11 may be used to monitor mechanical activity, such as atrial mechanical activity (e.g., an atrial contraction) and/or ventricular mechanical activity (e.g., a ventricular contraction). In some embodiments, the motion sensor 11 may be used to detect RA mechanical activity. A non-limiting example of a motion sensor 11 includes an accelerometer. In some embodiments, the mechanical activity detected by the motion sensor 11 may be used to supplement or replace electrical activity detected by one or more of the electrodes of the device 140. For example, the motion sensor 11 may be used in addition to, or as an alternative to, the proximal housing-based electrode 24.

The mechanical activity detected by the motion sensor 11 may correspond to various heart sounds. In general, heart sounds are associated with mechanical vibrations of a patient's heart and the flow of blood through the heart valves and, thus, may be highly correlated with pressure gradients across heart valves and blood pressure. Heart sounds may be not only due to vibrations of and pressure within the heart, but may also be due to the entire cardiohemic system, e.g., blood, heart, great arteries, etc. Heart sounds may recur with each cardiac cycle and are separated and classified according to the activity associated with the vibration.

The first heart sound is referred to as "S1," and can be thought of as the vibration sound made by the heart during closure of the atrioventricular, or AV, valves, i.e., the mitral valve and tricuspid valve. The S1 sound can sometimes be broken down into the M1 sound component, from the closing of the mitral valve, and the T1 sound component, from the closing of the tricuspid valve. The second heart sound is referred to as "S2," and results from the closure of the semilunar valves, i.e., the pulmonary and aortic valves. The S2 heart sound can be thought of as marking the beginning of diastole. The S2 sound can also be broken down into component parts. The P2 sound component is from the closing of the pulmonary valve and the A2 sound component is from the closing of the aortic valve. The third and fourth heart sounds are referred to as "S3" and "S4" respectively, and can be conceptualized as related to filling of the ventricles during diastole. S3 is due to rapid filling of the ventricles and can occur when the ventricular wall is not relaxed when a large volume of blood flows into the ventricles from the atria. S4 is caused by blood rapidly filling into the ventricles from the atria due to atrial contraction.

The device 140 may be implanted such that the electrode 12 is positioned to sense electrical activity or deliver pacing therapy to a specific part of the patient's LV myocardium. For example, the electrode 12 may be implanted in the basal, septal, or basal-septal region of the LV.

Figure 3:
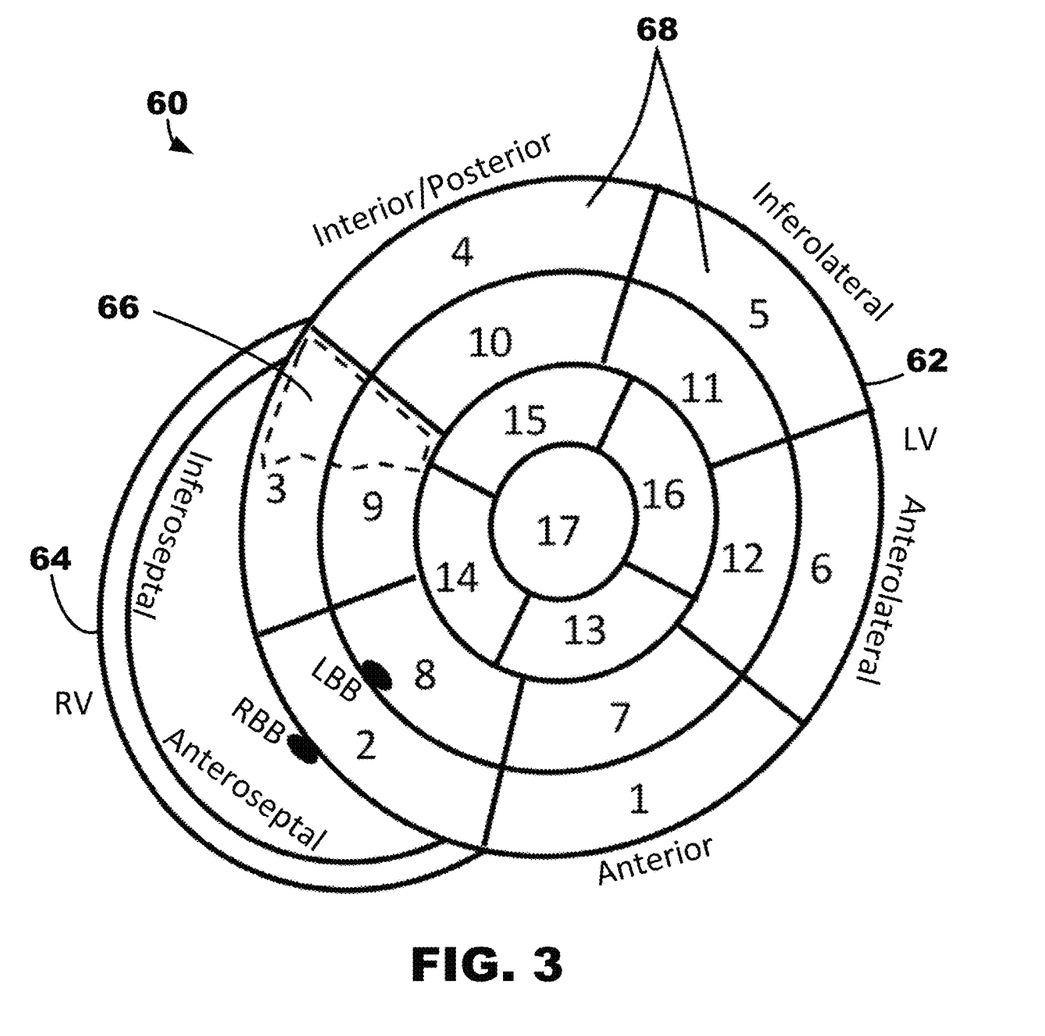
FIG. 3 is a conceptual diagram that shows electrode implantation locations relative to a map of a patient's heart in a standard 17 segment view for use with, for example, the cardiac therapy system of FIG. 1.

FIG. 3 is a two-dimensional (2D) ventricular map 60 of a patient's heart (e.g., a top-down view) showing the LV 62 in a standard 17 segment view and the RV 64. The map 60 includes a plurality of areas 68 corresponding to different regions of a human heart. As illustrated, the areas 68 are numerically labeled 1-17 (which, e.g., correspond to a standard 17 segment model of a human heart, correspond to 17 segments of the left ventricle of a human heart, etc.). Areas 68 of the map 60 may include basal anterior area 1, basal anteroseptal area 2, basal inferoseptal area 3, basal inferior area 4, basal inferolateral area 5, basal anterolateral area 6, mid-anterior area 7, mid-anteroseptal area 8, mid-inferoseptal area 9, mid-inferior area 10, mid-inferolateral area 11, mid-anterolateral area 12, apical anterior area 13, apical septal area 14, apical inferior area 15, apical lateral area 16, and apex area 17. The inferoseptal and anteroseptal areas of the right ventricle 64 are also illustrated, as well as the right bunch branch (RBB) and left bundle branch (LBB).

In some embodiments, any of the tissue-piercing electrodes of the present disclosure may be implanted in the basal and/or septal region of the LV myocardium of the patient's heart. In particular, the tissue-piercing electrode may be implanted from the triangle of Koch region of the RA through the RA endocardium and central fibrous body.

Once implanted, the tissue-piercing electrode may be positioned in the target implant region 4 (FIG. 2), such as the basal and/or septal region of the LV myocardium. With reference to map 60, the basal region includes one or more of the basal anterior area 1, basal anteroseptal area 2, basal inferoseptal area 3, basal inferior area 4, mid-anterior area 7, mid-anteroseptal area 8, mid-inferoseptal area 9, and mid-inferior area 10. With reference to map 60, the septal region includes one or more of the basal anteroseptal area 2, basal anteroseptal area 3, mid-anteroseptal area 8, mid-inferoseptal area 9, and apical septal area 14.

In some embodiments, a tissue-piercing electrode of an implantable medical device, such as the device 140 of FIG. 2, may be positioned in the basal septal region of the LV myocardium when implanted. The basal septal region may include one or more of the basal anteroseptal area 2, basal inferoseptal area 3, mid-anteroseptal area 8, and mid-inferoseptal area 9.

In some embodiments, the tissue-piercing electrode may be positioned in the high inferior/posterior basal septal region of the LV myocardium when implanted. The high inferior/posterior basal septal region of the LV myocardium may include a portion of at least one of the basal inferoseptal area 3 and mid-inferoseptal area 9. For example, the high inferior/posterior basal septal region may include region 66 illustrated generally as a dashed-line boundary. As shown, the dashed line boundary represents an approximation of about where the high inferior/posterior basal septal region and may take somewhat different shape or size depending on the particular application. Without being bound by any particular theory, intraventricular synchronous pacing and/or activation may result from stimulating the high septal ventricular myocardium due to functional electrical coupling between the subendocardial Purkinje fibers and the ventricular myocardium.

Although particular devices are illustrated in FIGS. 1-2, such as device 104, device 106, and device 140, the techniques of the present disclosure may be used with any suitable cardiac therapy system. Such suitable cardiac therapy systems generally include a controller.

Figure 4:
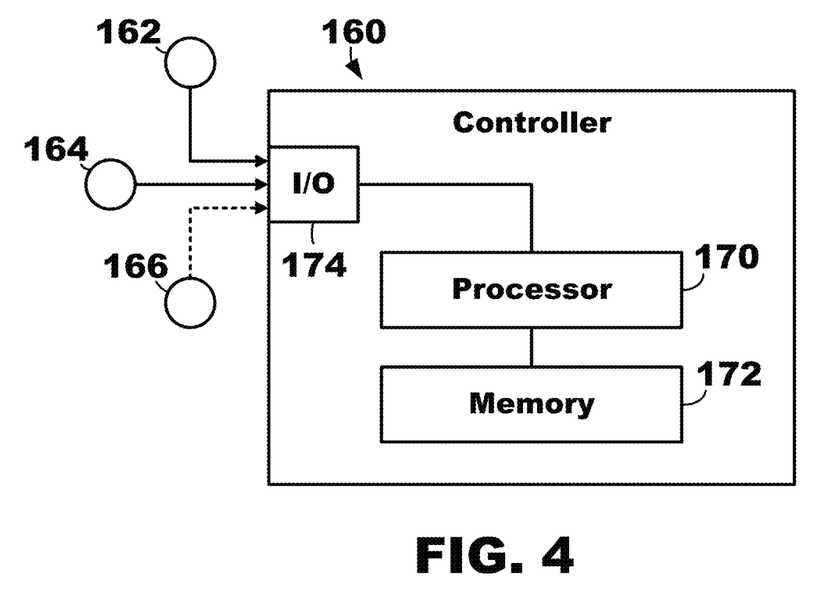
FIG. 4 is a conceptual diagram that shows one example of a controller for use with, for example, the cardiac therapy system of FIG. 1.

FIG. 4 shows one example of cardiac therapy system that includes a controller 160 that may be used with various IMDs of the present disclosure. The controller 160 is operably coupled to a first electrode 162, a motion sensor 164, and a second electrode 166. In particular, the controller 160 may include a processor 170, a memory 172 operably coupled to the processor, and a communication interface 174, or input/output interface, operably coupled to the processor and the first electrode 162, the motion sensor 164, and the second electrode 166.

In general, various components of the controller 160 may be contained within the first medical device, the second medical device, another medical device, or any combination of these. In some embodiments, the first electrode 162 and the motion sensor 164 may be coupled to a housing of a first medical device. The second electrode 166 may be coupled to a housing of a second medical device that is separate from the first medical device. Although various operable connections are contemplated, in some embodiments, the first electrode 162 and the motion sensor 164 may be coupled to the communication interface 174 using a wired connection. The second electrode 166 may be coupled to the communication interface 174 using a wireless connection. An electrical signaling pulse delivered through the patient's body may also be used. In other embodiments, the first electrode 162, the motion sensor 164, and the second electrode 166 are coupled to the housing of a single IMD and coupled using a wired connection.

One or more of the components of devices described herein, such as controllers, interfaces, or sensors, may include a processor, such as a central processing unit (CPU), computer, logic array, or other device capable of directing data coming into or out of the respective device. In general, the controller may include one or more computing devices having memory, processing, and communication hardware. The controller may include circuitry used to couple various components of the controller together or with other components operably coupled to the controller. The functions of the controller may be performed by hardware and/or as computer instructions on a non-transient computer readable storage medium.

The processor of the controller may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, devices, methods, and other functionality may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. The controller functionality as described herein may be implemented in any manner known to one skilled in the art who has the benefit of this disclosure.

The cardiac therapy systems of the present disclosure may perform various functionality to perform mode switching. For example, cardiac therapy systems may detect AF and mode switch accordingly between or among a plurality of different pacing modes. In some embodiments, cardiac therapy systems may switch between a dual-chamber sensing mode (e.g., VDD or DDD) and a single-chamber sensing mode (e.g., VVI) depending on whether AF has been detected.

Figure 5:
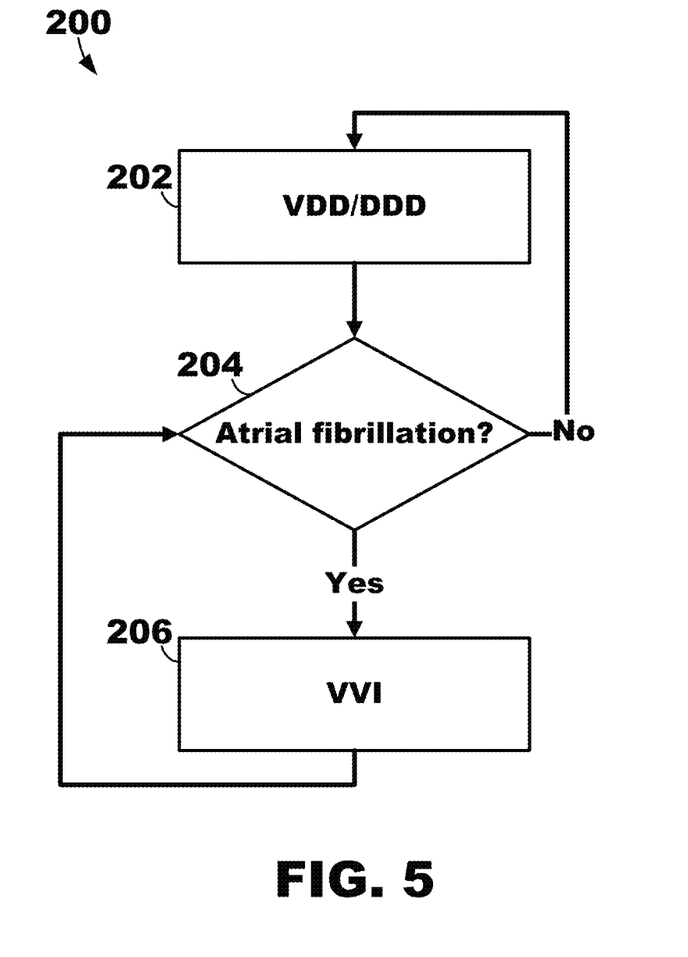
FIG. 5 is a flow diagram that shows one example of a method of mode switching for use with, for example, the cardiac therapy system of FIG. 1.

FIG. 5 shows one example of a method 200 of mode switching during cardiac therapy delivery that may be used with cardiac therapy systems of the present disclosure. In general, the method 200 facilitates mode switching between a VDD or DDD (VDD/DDD) mode and a VVI mode. Switching detection may be performed at any suitable rate.

In some embodiments, the method 200 is performed for each cardiac cycle. In other embodiments, the method 200 is performed periodically (e.g., every 5 cardiac cycles, every 10 cardiac cycles, every 1 second, every 2 second, every 5 second, etc.).

VDD refers to a mode of the cardiac therapy system that is configured to sense atrial and ventricular activity, such as electrical activations or other events, and paces only one or both ventricles. This mode may be used, for example, for patient's with normal sinus rhythm but with an AV block. DDD refers to a mode of the cardiac therapy system that is configured to both sense activity and deliver pacing to both one or both atria and one or both ventricles as needed. VVI refers to a mode of the cardiac therapy system that is configured to pace one or both ventricles in response to an irregular intrinsic ventricular rhythm (for example, a ventricular rhythm falling below a threshold). The VDD/DDD mode may be described as a pacing mode using dual-chamber sensing. VVI mode may be described as a pacing mode using single-chamber sensing.

The method 200 may include delivering cardiac therapy in a VDD/DDD mode 202. In some embodiments, sensing of P-waves and/or an atrial kick may be used to trigger pacing in a VDD/DDD mode. The P-wave may be indicative of an atrial activation or other event.

The method 200 may include determining whether the patient's heart is experiencing atrial fibrillation (AF) 204. The determination may be made using monitored electrical or mechanical activity of the patient's heart or some combination of these measurements. In some embodiments, at least one measurement of electrical activity and at least one measurement of mechanical activity are used to determine whether the patient's heart is experiencing AF. The determination 204 may be made one or more times periodically or when triggered, for example, by detecting the absence of a near-field or far-field P-wave.

The method 200 may also include delivering cardiac therapy in a VVI mode 206 in response to determining that the patient's heart is experiencing AF. In response to determining that the patient's heart is not experiencing AF, the method 200 may return, or continue, to deliver cardiac therapy in a VDD/DDD mode 202.

Far-field sensing of P-waves may be challenging for use in VDD/DDD modes because the P-wave amplitudes are small. The issue may be further complicated when the patient goes into AF as P-waves can become even smaller and may be even harder to pick up. Utilizing mechanical activity may facilitate confirmation of whether atrial activation has occurred. In particular, an atrial kick typically follows normal or paced atrial activation. The atrial kick may manifest as a distinguishable amplitude change on mechanical activity sensed, for example, by an integrated accelerometer.

Figure 6:
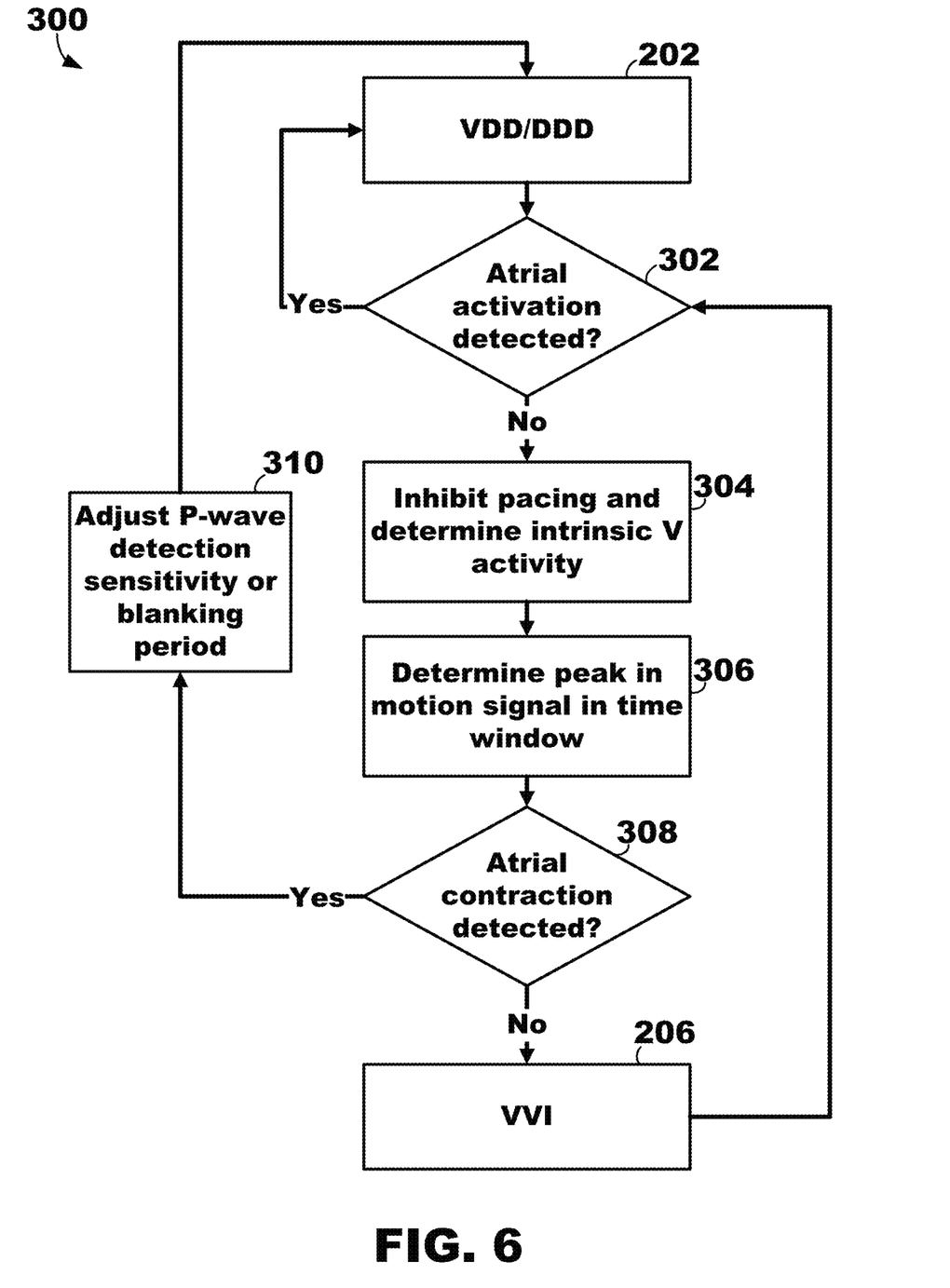
FIG. 6 is a flow diagram that shows one example of a specific method of implementing the method of FIG. 5 for use with, for example, the cardiac therapy system of FIG. 1.

FIG. 6 shows one example of a particular method that may be used to implement the method 200 of FIG. 5 to determine whether to deliver cardiac therapy in a VDD/DDD mode 202 or in a VVI mode 206, especially when using far-field P-waves. As illustrated, the method 300 may include determining whether atrial activation has been detected 302, which may provide an indication of whether AF may be present, while delivering cardiac therapy in a VDD/DDD mode 202 using dual-chamber sensing. One example of detecting atrial activation includes detecting the P-wave. The method 300 may continue to deliver cardiac therapy in a VDD/DDD mode 202, for example, in response to a P-wave being detected in sensed electrical activity.

When a P-wave is not detected, there may be possible AF. In other words, the absence of a P-wave may be indicative of AF. The method 300 may withhold, or inhibit, pacing and detect intrinsic ventricular electrical activity 304, for example, detecting intrinsic ventricular activation in response to determining that no P-wave has been detected.

Without detecting the P-wave, the system may determine whether a mechanical artifact of atrial activation is present, such as an atrial kick. The method 300 may determine a peak in a motion sensor signal within a time window 306, for example, in response to determining the intrinsic ventricular electrical activity. In some embodiments, the peak in the motion sensor signal may indicate mechanical activity that corresponds to the S4 heart sound, which may be described as an A4 signal. Then, the method 300 may include determining whether an atrial kick has been detected 308, for example, based on the peak and a threshold value. For example, the magnitude of the peak may be compared to the threshold value. In some embodiments, a small peak below a threshold value indicates that the P-wave was not, or was unlikely, to have been present in the far-field signal, for example, due to the patient's heart being in AF.

Without an atrial kick, the system may be able to determine that AF is not present. The method 300 may include switching to a VVI mode 206 using single-chamber sensing, for example, in response to determining that no atrial kick is detected. The next cardiac cycle may be paced in the VVI mode 206. The method 300 may return, or continue, to determine whether a P-wave has been detected 302. If a P-wave has returned, the method 300 may switch back to a VDD/DDD mode 202.

When the atrial kick is detected without detecting the P-wave, the system may adjust P-wave detection techniques to facilitate fewer "false negatives" of P-wave detection or fewer "false positives" of possible AF detection. The method 300 may adjust a P-wave detection sensitivity or a blanking period 310, for example, in response to determining that an atrial kick is detected. The P-wave detection sensitivity may also be described as an atrial activation threshold, such as based on magnitude of a peak where the P-wave is expected, to detect the P-wave. Sensitivities may be based off amplitudes of the electrical activity or differences in amplitude within a sensing time-window or time-gradients of amplitudes (e.g., a slope threshold). The method 300 may return, or continue, to deliver cardiac therapy in a VDD/DDD mode 202 using the adjusted sensitivity or blanking period. These adjustments to sensitivity or blanking may facilitate more accurate detection of a P-wave and, therefore, more accurate detection of AF using sensed electrical activity.

As used herein, the term "blanking period" refers to a time period or mode in which the device does not sense any electrical or mechanical activity, which may facilitate avoiding cross-interference or over sensing.

Figure 7:
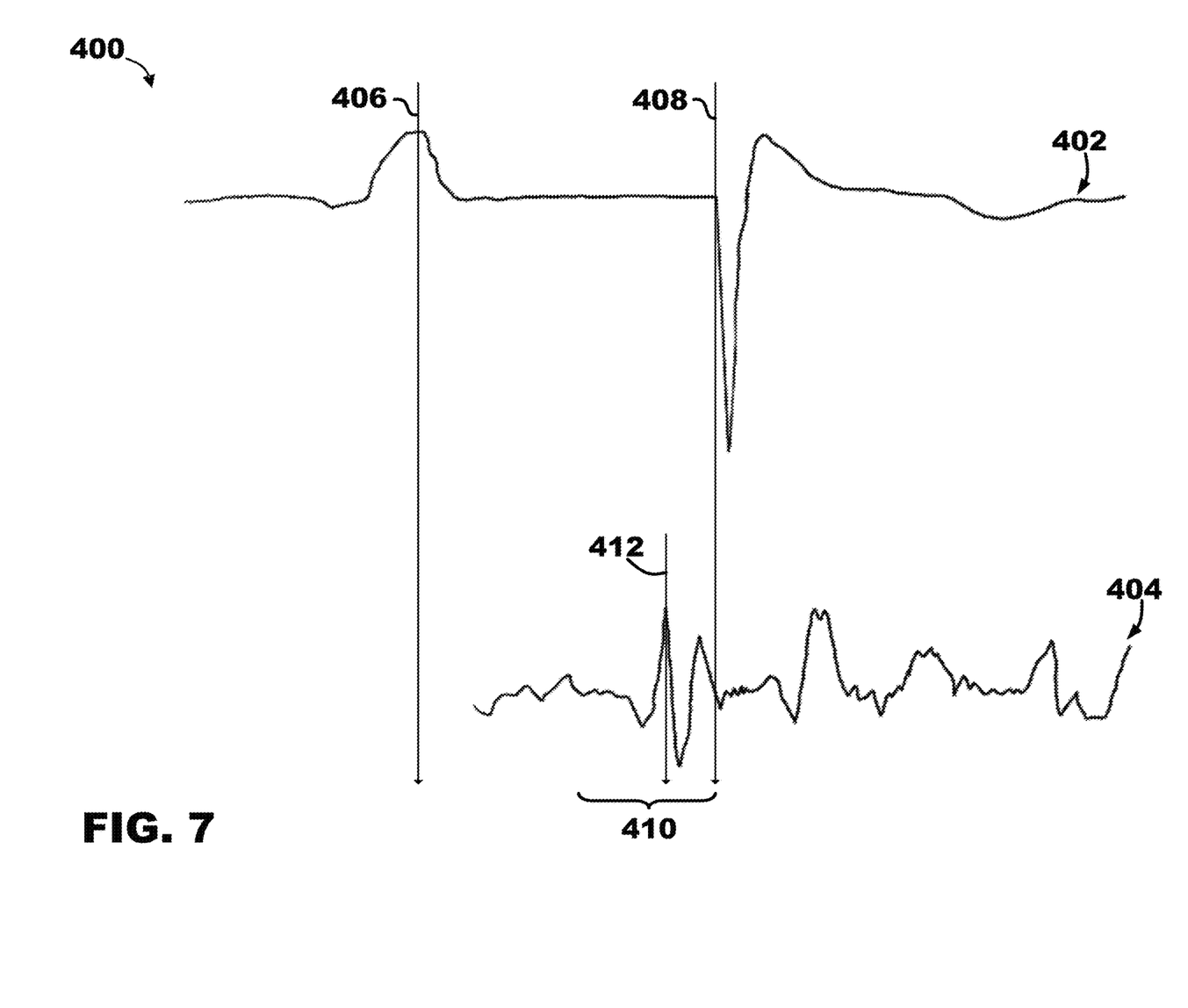
FIG. 7 is a plot that shows various intervals in an electrical activity signal and a mechanical activity signal for use with, for example, the methods of FIGS. 5-6 or the cardiac therapy system of FIG. 1.

With various techniques being described, FIG. 7 shows one example of a plot 400 of an electrical activity signal and a mechanical activity signal upon which the various techniques may be used. The electrical activity signal 402 may be acquired in any suitable manner. In some embodiments the electrical activity signal 402 is an EGM signal. The mechanical activity signal 404 may be acquired in any suitable manner. In some embodiments, the mechanical activity signal 404 is an accelerometer signal from a motion sensor coupled to the patient's heart. In one example, the mechanical activity signal 404 is obtained from a motion sensor implanted in a ventricle or an atrium. The motion sensor may be coupled to a leadless or intracardiac IMD.

In one example, the electrical activity signal 402 may be obtained from a near-field signal detected by an electrode implanted in an atrium. In another example, the electrical activity signal 402 may be obtained from a far-field signal detected by an electrode implanted in a ventricle. The electrode used to detect the electrical activity signal 402 may be coupled to a leaded or leadless IMD, which may or may not be an intracardiac IMD.

The electrical activity signal 402 may or may not contain a P-wave 406. If the P-wave 406 is present, the implantable medical system may continue to pace using VDD/DDD pacing or may switch to VDD/DDD pacing. If the P-wave 406 is not present, the implantable medical system may check to confirm whether the patient has AF. The P-wave may be detected using any suitable technique, such as detecting a peak and comparing the peak to a minimum magnitude threshold. Any suitable technique for P-wave sensing and detection may be used, for example, including techniques described in U.S. Pat. No. 10,342,981 (Ghosh et al.), issued Jul. 9, 2019, entitled "Far-field P-wave sensing in near real-time for timing delivery of pacing therapy in a cardiac medical device and medical device system."

In one example, if the P-wave 406 is not present, the system may inhibit pacing and, instead of pacing, may detect an intrinsic ventricular activation 408, which may be represented as the start of a QRS complex on the electrical activity signal 402. A timestamp of the intrinsic ventricular activation may be noted with a timestamp.

A corresponding mechanical activity signal 404 may be examined in a time window 410 that starts earlier than the intrinsic ventricular activation, which may immediately precede the timestamp. For example, a time window 410 may have a duration less than or equal to 100 ms, 125 ms, 150 ms, 175 ms, 200 ms. In one example, the time window 410 is equal to 150 ms. The system may determine whether an atrial kick 412 (or an A4 signal corresponding to an S4 heart sound) is present in the mechanical activity signal 404 within the time window 410.

The atrial kick 412 may be detected, for example, when the mechanical activity signal 404 exceeds a minimum magnitude threshold. The minimum magnitude threshold may be set, for example, based on a log of previous amplitudes of the atrial kick during VDD/DDD pacing. The minimum magnitude threshold may be based on a mean atrial kick amplitude and the standard deviation of the logged, or historical, amplitudes. In one example, the minimum magnitude threshold may be equal to the mean atrial kick amplitude minus 2 standard deviations.

If the atrial kick 412 is present, the system may continue to pace using VDD/DDD pacing or may switch to VDD/DDD pacing. In addition, one or both the sensitivity of P-wave detection or a blanking period associated with P-wave detection may be adjusted, for example, to facilitate minimizing false negative detections of the P-wave 406. If the atrial kick 412 is not present, the system may switch to VVI pacing for the next cardiac cycle until, for example, one or both of the P-wave and the atrial kick are present in the respective signals.

ILLUSTRATIVE EMBODIMENTS

While the present disclosure is not so limited, an appreciation of various aspects of the disclosure will be gained through a discussion of the specific illustrative embodiments provided below. Various modifications of the illustrative embodiments, as well as additional embodiments of the disclosure, will become apparent herein.

In embodiment A1, a method comprises:
- determining whether electrical activity is indicative of atrial fibrillation;
- determining whether mechanical activity is indicative of atrial fibrillation; and
- adjusting a pacing parameter or mode based on whether the electrical activity and the mechanical activity are indicative of atrial fibrillation.

In embodiment A2, a method comprises the method according to embodiment A1, wherein the electrical activity comprises electrical activity of one or both atria of the patient's heart based on a far-field measurement.

In embodiment A3, a method comprises the method according to any preceding A embodiment, wherein determining whether electrical activity is indicative of atrial fibrillation comprises determining whether a P-wave is detected.

In embodiment A4, a method comprises the method according to any preceding A embodiment, wherein the mechanical activity comprises mechanical activity of the patient's heart corresponding to an S4 heart sound.

In embodiment A5, a computer readable medium comprises instructions stored thereon, the instructions when executed cause a processor to perform the method according to any preceding A embodiment.

In embodiment B1, an implantable medical system comprises:
- a first electrode to sense electrical activity of one or both ventricles of a patient's heart or to deliver cardiac therapy to one or both ventricles of the patient's heart;
- a second electrode to sense electrical activity of one or both atria of the patient's heart;
- a motion sensor to sense mechanical activity of the patient's heart; and
- a controller operably coupled to the first electrode, second electrode, and the motion sensor, the controller configured to:
  - switch between a dual-chamber sensing mode to deliver pacing based on sensing electrical activity of at least one atrium and at least one ventricle of the patient's heart and a single-chamber sensing mode to deliver pacing based on sensing electrical activity of only one or both ventricles of the patient's heart;
  - deliver pacing to at least one of the ventricles of the patient's heart using the first electrode in the dual-chamber sensing mode;
  - determine whether the electrical activity of one or both atria sensed by the second electrode is indicative of atrial fibrillation;
  - in response to determining that the electrical activity of one or both atria is indicative of atrial fibrillation, determine whether mechanical activity of the patient's heart sensed by the motion sensor represents atrial contraction; and
  - in response to determining that the mechanical activity of the patient's heart does not represent the atrial contraction, deliver inhibited pacing using the first electrode in the single-chamber sensing mode.

In embodiment B2, a system comprises the system according to embodiment B1, wherein the electrical activity of one or both atria of the patient's heart is based on a far-field measurement sensed by the second electrode.

In embodiment B3, a system comprises the system according to embodiment B1, wherein the first electrode and the second electrode are coupled to a leadless implantable medical device (IMD), wherein:
- a housing of the leadless IMD is implantable in the right atrium (RA) of the patient's heart; and
- the first electrode is implantable from the triangle of Koch region of the RA of the patient's heart to deliver cardiac therapy to or sense electrical activity of the left ventricle (LV) in the basal region, septal region, or basal-septal region of the left ventricular myocardium of the patient's heart.

In embodiment B4, a system comprises the system according to embodiment B1, wherein the electrical activity of one or both atria of the patient's heart is based on a near-field measurement sensed by the second electrode.

In embodiment B5, a system comprises the system according to any preceding B embodiment, wherein to determine whether the electrical activity of one or both atria sensed by the second electrode is indicative of atrial fibrillation, the controller is further configured to determine whether a P-wave is detected.

In embodiment B6, a system comprises the system according to embodiment B5, wherein, in response to determining that the mechanical activity of the patient's heart represents the atrial contraction, the controller is further configured to:
- adjust an atrial activation threshold to detect the P-wave or adjust P-wave detection blanking periods; and
- continue delivering pacing to at least one of the ventricles of the patient's heart in the dual-chamber sensing mode.

In embodiment B7, a system comprises the system according to any preceding B embodiment, wherein, in response to determining that the electrical activity of one or both atria is not indicative of atrial fibrillation, the controller is further configured to continue delivering pacing to at least one of the ventricles of the patient's heart in the dual-chamber sensing mode.

In embodiment B8, a system comprises the system according to any preceding B embodiment, wherein the mechanical activity of the patient's heart sensed by the motion sensor includes mechanical activity corresponding to an S4 heart sound.

In embodiment B9, a system comprises the system according to any preceding B embodiment, wherein to determine whether mechanical activity of the patient's heart sensed by the motion sensor represents the atrial contraction, the controller is further configured to detect an intrinsic ventricular activation of the patient's heart.

In embodiment B10, a system comprises the system according to embodiment B9, wherein to determine whether mechanical activity of the patient's heart sensed by the motion sensor represents the atrial contraction, the controller is further configured to use mechanical activity in a time window that starts earlier than the intrinsic ventricular activation.

In embodiment B11, a system comprises the system according to any preceding B embodiment, wherein to determine whether mechanical activity of the patient's heart sensed by the motion sensor represents the atrial contraction, the controller is further configured to determine whether the mechanical activity exceeds a threshold value.

In embodiment B12, a system comprises the system according to embodiment B11, wherein the controller is further configured to determine that the mechanical activity represents the atrial contraction in response to the mechanical activity exceeding the threshold value.

In embodiment B13, a system comprises the system according to any preceding B embodiment, wherein, after delivering inhibited pacing to at least one of the ventricles of the patient's heart in the single-chamber sensing mode, the controller is further configured to return to delivering pacing to at least one of the ventricles of the patient's heart in the dual-chamber sensing mode in response to determining that the electrical activity of one or both atria is not indicative of atrial fibrillation or determining that the mechanical activity of the patient's heart is indicative of the atrial contraction.

In embodiment B14, a system comprises the system according to embodiment B13, wherein determining that the electrical activity of one or both atria is not indicative of atrial fibrillation comprises detecting a P-wave in the electrical activity of one or both atria, and wherein determining that the mechanical activity of the patient's heart represents the atrial contraction comprises determining that the mechanical activity exceeds a threshold value.

In embodiment C1, a method comprises:
delivering pacing to at least one of the ventricles of a patient's heart in a dual-chamber sensing mode to deliver pacing based on sensing electrical activity of at least one atrium and at least one ventricle of the patient's heart;
determining whether electrical activity of one or both atria of the patient's heart is indicative of atrial fibrillation;
in response to determining that the electrical activity of one or both atria is indicative of atrial fibrillation, determining whether mechanical activity of the patient's heart represents an atrial contraction; and
in response to determining that the mechanical activity of the patient's heart does not represent the atrial contraction, delivering inhibited pacing to at least one of the ventricles of the patient's heart in a single-chamber sensing mode to deliver pacing based on sensing electrical activity of only one or both ventricles of the patient's heart.

In embodiment C2, a method comprises the method according to embodiment C1, wherein the electrical activity of one or both atria of the patient's heart is based on a far-field measurement.

In embodiment C3, a method comprises the method according to any preceding C embodiment, wherein determining whether the electrical activity of one or both atria is indicative of atrial fibrillation comprises determining whether a P-wave is detected.

In embodiment C4, a method comprises the method according to any preceding C embodiment, wherein the mechanical activity of the patient's heart includes mechanical activity corresponding to an S4 heart sound.

In embodiment C5, a computer readable medium comprises instructions stored thereon, the instructions when executed cause a processor to perform the method according to any preceding C embodiment.

In embodiment D1, an implantable medical system comprises:
a first medical device comprising a housing implantable in at least one of the ventricles of a patient's heart, the first medical device further comprising:
at least one electrode to sense electrical activity of at least one of the ventricles or to deliver cardiac therapy to at least one of the ventricles of the patient's heart; and
at least one motion sensor to sense mechanical activity of the patient's heart;
a second medical device in operative communication with the first medical device comprising at least one electrode to sense electrical activity of one or both atria of the patient's heart; and
a controller configured to:
switch between a dual-chamber sensing mode to deliver pacing based on sensing electrical activity of at least one atrium and at least one ventricle of the patient's heart and a single-chamber sensing mode to deliver pacing based on sensing electrical activity of only one or both ventricles of the patient's heart;
deliver pacing to at least one of the ventricles of the patient's heart in the dual-chamber sensing mode;
determine whether the electrical activity of one or both atria sensed by the second medical device is indicative of atrial fibrillation;
in response to determining that the electrical activity of one or both atria is indicative of atrial fibrillation, determine whether mechanical activity of the patient's heart sensed by the first medical device represents the atrial contraction; and
in response to determining that the mechanical activity of the patient's heart does not represent the atrial contraction, deliver inhibited pacing to at least one of the ventricles of the patient's heart in the single-chamber sensing mode.

In embodiment D2, a system comprises the system according to embodiment D1, wherein the first medical device comprises the controller.

In embodiment D3, a system comprises the system according to any preceding D embodiment, wherein the electrical activity of one or both atria of the patient's heart is based on a far-field measurement sensed by the at least one electrode of the second medical device.

In embodiment D4, a system comprises the system according to any preceding D embodiment, wherein first medical device is an intracardiac implantable medical device.

In embodiment D5, a system comprises the system according to any preceding D embodiment, wherein the first medical device is a leadless implantable device positioned in the left ventricle of the patient's heart.

In embodiment D6, a system comprises the system according to any preceding D embodiment, wherein the second medical device is a right-sided implantable device or an extravascular device.

In embodiment D7, a system comprises the system according to any preceding D embodiment, wherein the housing of the first medical device is implantable in the left ventricle (LV) of the patient's heart and the at least one electrode of the first medical device is implantable to deliver cardiac therapy to or sense electrical activity of the LV, wherein the second medical device comprises an extravascular housing.

In embodiment D8, a system comprises the system according to any preceding D embodiment, wherein the second medical device is operably coupled to communicate an atrial activation time to the first medical device to deliver pacing from the first medical device based on the atrial activation time.

Thus, various embodiments of the CARDIAC RESYNCHRONIZATION THERAPY MODE SWITCHING USING MECHANICAL ACTIVITY are disclosed. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

Th singular forms "a," "an," and "the" encompass embodiments having plural referents unless its context clearly dictates otherwise.

The phrases "at least one of," "comprises at least one of," and "one or more of" followed by a list refers to any one of the items in the list and any combination of two or more items in the list.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

What is claimed is:

1. An implantable medical system comprising:
   a first electrode to one or both of sense electrical activity of one or both ventricles of a patient's heart and to deliver cardiac therapy to one or both ventricles of the patient's heart;
   a second electrode to sense electrical activity of one or both atria of the patient's heart;
   a motion sensor to sense mechanical activity of the patient's heart; and
   a controller operably coupled to the first electrode, second electrode, and the motion sensor, the controller configured to:
   switch between a first pacing mode to deliver pacing based on sensing electrical activity of at least one atrium and at least one ventricle of the patient's heart and a second pacing mode to deliver pacing based on sensing electrical activity of only one or both ventricles of the patient's heart;
   deliver pacing to at least one of the ventricles of the patient's heart using the first electrode in the first pacing mode;
   determine whether the electrical activity of one or both atria sensed by the second electrode is indicative of atrial fibrillation;
   in response to determining that the electrical activity of one or both atria is indicative of atrial fibrillation, determine whether mechanical activity of the patient's heart sensed by the motion sensor represents an atrial contraction; and
   in response to determining that the mechanical activity of the patient's heart does not represent the atrial contraction, deliver inhibited pacing using the first electrode in the second pacing mode.

2. The system of claim 1, wherein the electrical activity of one or both atria of the patient's heart is based on a far-field measurement sensed by the second electrode.

3. The system of claim 1, wherein the first electrode and the second electrode are coupled to a leadless implantable medical device (IMD), wherein:
   a housing of the leadless IMD is implantable in the right atrium (RA) of the patient's heart; and
   the first electrode is implantable from the triangle of Koch region of the RA of the patient's heart to one or both of deliver cardiac therapy to and sense electrical activity of the left ventricle (LV) in the basal region, septal region, or basal-septal region of the left ventricular myocardium of the patient's heart.

4. The system of claim 1, wherein the electrical activity of one or both atria of the patient's heart is based on a near-field measurement sensed by the second electrode.

5. The system of claim 1, wherein to determine whether the electrical activity of one or both atria sensed by the second electrode is indicative of atrial fibrillation, the controller is further configured to determine whether a P-wave is detected.

6. The system of claim 5, wherein, in response to determining that the mechanical activity of the patient's heart represents the atrial contraction, the controller is further configured to:
adjust an atrial activation threshold to detect the P-wave or adjust P-wave detection blanking periods; and
continue delivering pacing to at least one of the ventricles of the patient's heart in the first pacing mode.

7. The system of claim 1, wherein, in response to determining that the electrical activity of one or both atria is not indicative of atrial fibrillation, the controller is further configured to continue delivering pacing to at least one of the ventricles of the patient's heart in the first pacing mode.

8. The system of claim 1, wherein the mechanical activity of the patient's heart sensed by the motion sensor includes mechanical activity corresponding to an S4 heart sound.

9. The system of claim 1, wherein to determine whether mechanical activity of the patient's heart sensed by the motion sensor represents the atrial contraction, the controller is further configured to detect an intrinsic ventricular activation of the patient's heart.

10. The system of claim 9, wherein to determine whether mechanical activity of the patient's heart sensed by the motion sensor represents the atrial contraction, the controller is further configured to use mechanical activity in a time window that starts earlier than the intrinsic ventricular activation.

11. The system of claim 1, wherein to determine whether mechanical activity of the patient's heart sensed by the motion sensor represents the atrial contraction, the controller is further configured to determine whether the mechanical activity exceeds a threshold value.

12. The system of claim 11, wherein the controller is further configured to determine that the mechanical activity represents the atrial contraction in response to the mechanical activity exceeding the threshold value.

13. The system of claim 1, wherein, after delivering inhibited pacing to at least one of the ventricles of the patient's heart in the second pacing mode, the controller is further configured to return to delivering pacing to at least one of the ventricles of the patient's heart in the first pacing mode in response to determining that the electrical activity of one or both atria is not indicative of atrial fibrillation or determining that the mechanical activity of the patient's heart is indicative of the atrial contraction.

14. The system of claim 13, wherein determining that the electrical activity of one or both atria is not indicative of atrial fibrillation comprises detecting a P-wave in the electrical activity of one or both atria, and wherein determining that the mechanical activity of the patient's heart represents the atrial contraction comprises determining that the mechanical activity exceeds a threshold value.

15. An implantable medical system comprising:
a first medical device comprising a housing implantable in at least one of the ventricles of a patient's heart, the first medical device further comprising:
at least one electrode to one or both of sense electrical activity of at least one of the ventricles and to deliver cardiac therapy to at least one of the ventricles of the patient's heart; and
at least one motion sensor to sense mechanical activity of the patient's heart;
a second medical device in operative communication with the first medical device comprising at least one electrode to sense electrical activity of one or both atria of the patient's heart; and
a controller configured to:
switch between a first pacing mode to deliver pacing based on sensing electrical activity of at least one atrium and at least one ventricle of the patient's heart and a second pacing mode to deliver pacing based on sensing electrical activity of only one or both ventricles of the patient's heart;
deliver pacing to at least one of the ventricles of the patient's heart in the first pacing mode;
determine whether the electrical activity of one or both atria sensed by the second medical device is indicative of atrial fibrillation;
in response to determining that the electrical activity of one or both atria is indicative of atrial fibrillation, determine whether mechanical activity of the patient's heart sensed by the first medical device represents an atrial contraction; and
in response to determining that the mechanical activity of the patient's heart does not represent the atrial contraction, deliver inhibited pacing to at least one of the ventricles of the patient's heart in the second pacing mode.

16. The system of claim 15, wherein the first medical device comprises the controller.

17. The system of claim 15, wherein the electrical activity of one or both atria of the patient's heart is based on a far-field measurement sensed by the at least one electrode of the second medical device.

18. The system of claim 15, wherein first medical device is an intracardiac implantable medical device.

19. The system of claim 15, wherein the first medical device is a leadless implantable device positioned in the left ventricle of the patient's heart.

20. The system of claim 15, wherein the second medical device is a right-sided implantable device or an extravascular device.

21. The system of claim 15, wherein the housing of the first medical device is implantable in the left ventricle (LV) of the patient's heart and the at least one electrode of the first medical device is implantable to one or both of deliver cardiac therapy to and sense electrical activity of the LV, wherein the second medical device comprises an extravascular housing.

22. The system of claim 15, wherein the second medical device is operably coupled to communicate an atrial activation time to the first medical device to deliver pacing from the first medical device based on the atrial activation time.

* * * * *